United States Patent

Gilbert

[11] Patent Number: 5,950,355
[45] Date of Patent: *Sep. 14, 1999

[54] FLYING INSECT TRAP WITH DECORATIVE FRAME MOUNT

[75] Inventor: David Gilbert, Jonesboro, Ark.

[73] Assignee: Gilbert Industries, Jonesboro, Ark.

[*] Notice: This patent issued on a continued prosecution application filed under 37 CFR 1.53(d), and is subject to the twenty year patent term provisions of 35 U.S.C. 154(a)(2).

[21] Appl. No.: 08/825,954

[22] Filed: Apr. 3, 1997

[51] Int. Cl.$^6$ ................................................... A01M 1/04
[52] U.S. Cl. .................................................. 43/113; 43/114
[58] Field of Search ........................... 43/113, 114, 115, 43/116, 117; D26/85

[56] References Cited

U.S. PATENT DOCUMENTS

| | | |
|---|---|---|
| D. 264,414 | 5/1982 | Missir . |
| D. 364,479 | 11/1995 | Gilbert . |
| 2,686,988 | 2/1954 | Garber . |
| 3,708,908 | 1/1973 | Levey ........................................ 43/114 |
| 4,074,457 | 2/1978 | Sato ........................................... 43/114 |
| 4,411,093 | 10/1983 | Stout .......................................... 43/114 |
| 4,490,938 | 1/1985 | Baker ......................................... 43/114 |
| 4,577,434 | 3/1986 | Davis .......................................... 43/114 |
| 4,876,822 | 10/1989 | White .......................................... 43/113 |
| 5,253,448 | 10/1993 | Byom .......................................... 43/114 |
| 5,365,690 | 11/1994 | Nelson et al. . |
| 5,425,197 | 6/1995 | Smith .......................................... 43/114 |
| 5,513,465 | 5/1996 | Demarest ..................................... 43/114 |
| 5,651,211 | 7/1997 | Regan ......................................... 43/114 |

*Primary Examiner*—Kurt Rowan
*Attorney, Agent, or Firm*—Hill & Simpson

[57] ABSTRACT

A flying insect trap has a frame-like enclosure in which an insect-attracting light source and an adhesive surface are disposed. The front of the enclosure is covered by a front panel having a design formed therein which includes openings to provide access to the interior of the enclosure, so that insects attracted by the light source, which emits light through the openings in the front panel, will alight on the adhesive surface and become adhered thereto. A design panel is also disposed in the enclosure, which is closed at its rear by a rear panel. The design panel is visible through the openings in the front panel, and the design panel can have a design or an advertisement coordinated with the design or advertisement in the front panel. The enclosure can be angled so that the front thereof has a smaller area than the rear thereof, so that the light source can be disposed behind one of the sides of the enclosure, such as a bottom side, so as to be hidden from view by humans when the flying insect trap is mounted on a wall. The overall external appearance of the flying insect trap is aesthetically pleasing so that it can be employed in establishments wherein it is desired that the trap be unobtrusive to customers.

14 Claims, 1 Drawing Sheet

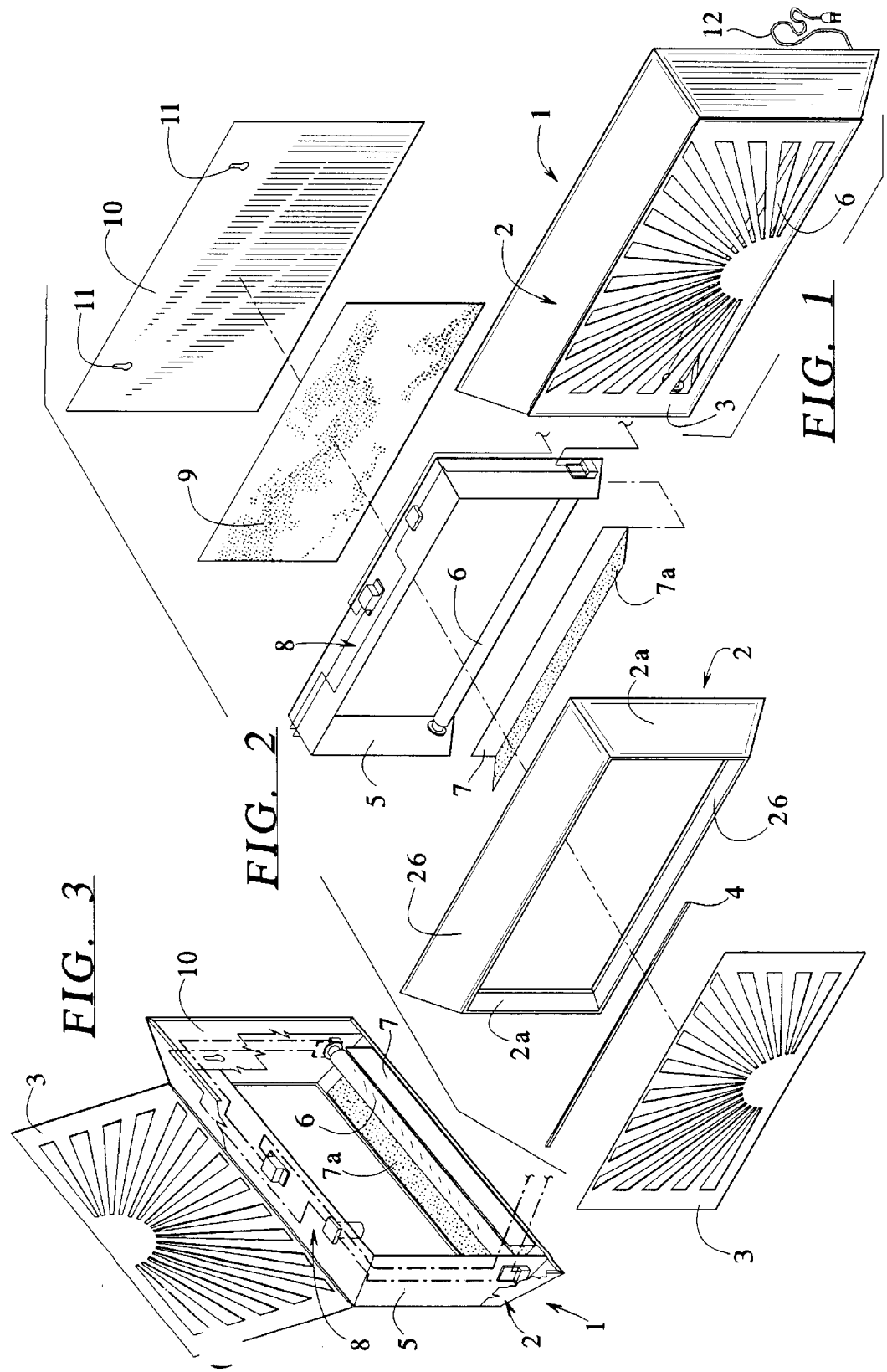

FLYING INSECT TRAP WITH DECORATIVE FRAME MOUNT

BACKGROUND OF THE INVENTION

1. Field of the Invention

The present invention is directed to a trap for flying insects, and in particular to a trap of the type having a source of illumination which attracts flying insects and a surface with an adhesive substance thereon to which the insects attracted by the illumination source become adhered.

2. Description of the Prior Art

Many types of flying insect traps, particularly for catching flies, are known wherein a light source is used to attract the flying insects to the interior of the trap, and wherein at least one surface of the trap interior is covered with an adhesive substance on which the insects alight, and to which they then become adhered. Usually the adhesive substance is applied on a removable backing, commonly referred to as a glue board, which can be removably mounted within the interior of the trap, so that it can be periodically replaced.

A common problem associated with flying insect traps of this type is that, in order to obtain maximum insect trapping capabilities, they must normally be placed in relatively conspicuous locations, at which they are also visible to persons in the vicinity of the trap. Conventional traps of this type, although effective for trapping insects, have not been particularly pleasing in appearance. If such traps are located, for example, in a factory or some other type of industrial facility, the absence of a pleasing appearance is not a significant factor. The absence in the market of a flying insect trap of this type with a pleasing appearance, however, has hindered the acceptance and use of flying insect traps of this type in commercial establishments such as restaurants and other venues wherein it is important to trap flying insects, but it is also important to do so in a manner which is as unobtrusive as possible to patrons of the establishment. Since a conventional flying insect trap employing a light source to attract insects has always had an appearance dictated solely by its utility as a trap, rather than embodying any decorative considerations, such conventional traps have been very difficult to employ in a manner which is unobtrusive to patrons or customers of the establishment in which they are used.

A flying insect trap of the type generally described above is known, for example, from U.S. Pat. No. 5,365,690, wherein a wall-mounted unit having angled sides and an angled enclosure for a light source and a glue board are provided. The enclosure in which the light source and the glue board are mounted is open at the top of the unit, providing access for flying insects attracted by the light source. The exterior of this unit is made of plastic, and it is still not a particularly visually attractive unit for use in establishments such as fine restaurants.

Another flying insect trap of the type employing a light source and a glue board is disclosed in U.S. Pat. No. Des. 364,479. This unit has a much more pleasing exterior appearance, and is in the form of a generally V-shaped wall sconce. The exterior of this unit is metal, and can be provided, for example, with a matte or polished brass finish. This unit is also open at the top for providing access to flying insects attracted by the light source, which alight on a glue board contained within a rectilinear enclosure at the top of the unit. The front panel of the unit is hinged, and can be opened to provide access to the interior of the unit.

SUMMARY OF THE INVENTION

It is an object of the present invention to provide a flying insect trap of the type using an illumination source to attract insects and an adhesive surface to trap insects attracted by the illumination source, which has an exterior appearance which is visibly pleasing and which allows the unit to be unobtrusively employed in a business establishment, while still being in full view of the customer or patrons of the establishment.

The above object is achieved in accordance with the principles of the present invention in a wall-mounted flying insect trap having a light source and an adhesive surface for trapping insects, wherein the light source and the adhesive surface are mounted inside a picture frame-like enclosure, with a front panel having a selected decorative or advertising design, with openings therein allowing access to the interior of the enclosure, and with a rear panel having a design or advertisement coordinated with the front panel, and being visible through the openings in the front panel. The front panel may be permanently or removably attached to the picture frame-like enclosure so that the owner of an establishment who purchases a number of flying insect traps of this type can have a number of different designs, rather than the same design repeated for every unit. Moreover, the back panel can be replaceable as well, so that different scenes or advertisements can be substituted.

The front panel, if permanently attached to the picture frame-like enclosure, is attached thereto, such as by a hinge, so that it can be opened to provide access to the interior of the enclosure for replacing the light source and the glue board. Instead of attachment of the front panel to the picture frame-like enclosure by a hinge, however, other temporary means for affixing the front panel to the enclosure can be used, such as a magnetic mount or channels provided in the top and bottom of the enclosure so that the front panel can be slighted through the channels into position to cover the front of the enclosure.

The picture frame-like enclosure is preferably inwardly angled relative to the rear panel, i.e., the front panel will be somewhat smaller in area than the rear panel. This allows the light source to be disposed, for example, at a bottom of the enclosure within one of the angled sides of the enclosure, so that it will be substantially hidden from direct view by customers or patrons when the flying insect trap is mounted at a conventional height on a wall. The openings in the front panel, however, allow light to exit the enclosure so as to attract flying insects, and also provide access for the flying insects to reach the interior of the trap so as to alight on the adhesive surface and become adhered thereto. The adhesive surface can also be mounted at the bottom angled side of the enclosure, and thus it will also be hidden from view to customer or patrons.

DESCRIPTION OF THE DRAWINGS

FIG. 1 is a front perspective view of a flying insect trap constructed in accordance with the principles of the present invention.

FIG. 2 is an exploded view of the basic components of the flying insect trap of FIG. 1.

FIG. 3 is a rear view of the flying insect trap of FIGS. 1 and 2, with the front panel opened and the rear panel partly broken away.

DESCRIPTION OF THE PREFERRED EMBODIMENTS

A flying insect trap 1 constructed in accordance with the principles of the present invention is shown in FIG. 1. The trap 1 has a picture frame-like enclosure 2 which surrounds and holds a front panel 3 having a decorative or advertising design cut therein. In the interior of the trap 1 is a light source 6, such as a fluorescent lamp, which is operated using standard A.C. power supplied from a power cord 12.

The enclosure 2 and the front panel 3 are preferably made of sheet metal, with the decorative or advertising design or pattern in the front panel 3 being cut therein by stamping.

In the exemplary embodiment shown in FIG. 1, and in the other figures, a "sunburst" design has been employed, however, any suitable decorative or advertising design can be used, as long as it accommodate suitable openings to provide access to the interior of the enclosure 2, so as to permit sufficient light from the light source 6 to exit from the interior of the trap 1 as well as providing access for flying insects to enter the interior of the trap 1.

As shown in the exploded view in FIG. 2, the enclosure 2 is formed by sidewalls 2a and upper and lower walls 2b, all of which are angled so that the enclosure 2 has a larger area at a rear thereof compared to the area at the front thereof. The front panel 3 is attached to the enclosure 2 by any suitable means, such as by a piano hinge 4 which, as shown in FIG. 3, allows the front panel 3 to be lifted upwardly so as to open the front of the enclosure 2 to expose the interior thereof. The front panel 3 can, however, be mounted to the enclosure 2 by any suitable manner, including mounting arrangements which allow the front panel 3 to be easily completely removed (separated) from the enclosure 2 such as magnetic attachment elements, or channels provided at the front edges of the upper and lower sides 2b so as to permit the front panel 3 to slide into the channels from either side of the enclosure 2. This allows the manufacture to make a number of different front panels 3, each with different designs, so that if an establishment purchases a number of such traps, they need not all be identical. This also allows the customer purchasing a trap 1 to select from among a number of different designs, which can then be easily included in the finished product.

Mounted inside the enclosure 2 is an electronics support unit 5, having a three-sided rectilinear form. The electronics support unit 5 fits inside the enclosure 2, and has sockets at opposite sides thereof for receiving the terminals of the light source 6 in a known manner. The electronics support unit 5 also carries all of the necessary electrical components for a standard fluorescent light circuit, including an on/off switch, ballast, a transformer and suitable wiring. These electronic components are standard and well-known, and are therefore generally referenced as operating electronics 8. When the electronics support unit 5 is inserted into the enclosure 2, with the light source 6 in place, the light source 6 will be disposed behind the lower side 2b of the enclosure 2. When the trap 1 is mounted on a wall at a conventional height in a room, the light source 6 will thus be generally hidden from view by humans, although the light from the light source 6 will project through the openings in the front panel 3 so as to provide the necessary flying insect attractancy.

A cardboard strip 7 with an adhesive surface 7a therein is fitted into the lower side 2b of the enclosure 2, such as by being folded along a fold parallel to the lower side 2b, so that the adhesive surface 7a conforms to the slanted interior of the lower surface 2b, whereas the back of the cardboard strip 7 is substantially vertical, and rests against the rearward components of the trap 1, described below. Folding of the cardboard strip 7 in this manner is sufficient to hold the cardboard 7 in place within the assembled trap 1, and thus it need not be attached in any permanent way to the other components. The adhesive surface 7a of the cardboard strip 7 will periodically become filled with trapped insects, and therefore the cardboard strip 7 must be periodically replaced, and therefore it is an advantage for the cardboard strip 7 to merely be placed inside the trap 1 without any permanent attachments, so as to facilitate such replacement.

The trap 1 is closed at the rear by a rear panel 10, having mounting openings 11 therein. Between the electronics support unit 5 and the rear panel is a design panel 9. Although referred to herein as a design panel 9, this panel can carry any type of indicia, including an advertisement, or can simply be a solid color. The indicia carried by the design panel 9 are preferably coordinated with the design in the front panel 3. In the exemplary embodiment shown in FIG. 2, therefore, a sky and cloud design is shown, to coordinate with the sunburst design shown in the front panel 3. It will be apparent, however, unlimited combinations of design and color and advertisement combinations can be made in the front panel 3 and the design panel 9.

The design panel 9 can be permanently or temporarily affixed, for example, to the rear panel 10, or can be held between the electronics support unit 5 and the rear panel 10 in any suitable manner. The design panel 9 can thus be mounted in a manner so that it can be periodically replaced or substituted if and when a change in the design of the front panel 3 is made.

As shown in FIG. 3, in the exemplary embodiment the front panel 3 can be raised by means of the hinge 4 so as to allow access to the interior of the trap 1 for replacement of the cardboard strip 7 and/or the light source 6. Access to the design panel is also made in this manner, if the design panel 9 is temporarily mounted so as to be removable.

In the described embodiment, only one light source 6 has been employed, however, there is room, if desired, to accommodate a second light source beneath the upper side 2b of the enclosure 2. Such a second light source would then also be mounted on the electronics support unit 5, with suitable modifications in the operating circuitry 8 to operate both light sources. When the fly trap 1 is conventionally mounted, however, such a second light source disposed at the upper portion of the trap 1 would be more visible to humans than the light source 6, and thus the presence of such a second light source may, under some circumstances, be less desirable from an aesthetic point of view, as long as it is not necessary to increase the insect attractancy.

Also, although the enclosure 2 has been shown herein as being inwardly angled from rear to front, a completely rectilinear enclosure could be used as well, if the design employed in the front panel 3 does not have openings in the lower region thereof so that the light source 6 can be hidden behind the lower region of the front panel 3. Moreover, it is not necessary that the enclosure to be four-sided. Triangular or other configurations are possible while still employing a conventional linear light source 6. Even circular or other curved configurations can be employed, however, the light source 6 will then have to be curved in an appropriate manner as well.

Although other modifications and changes may be suggested by those skilled in the art, it is the intention of the inventor to embody within the patent warranted hereon all changes and modifications as reasonably and properly come within the scope of his contribution to the art.

I claim as my invention:

1. A flying insect trap comprising:
    an enclosure having a rear adapted for mounting on a vertical surface, a front spaced from said rear and adapted to be vertically oriented, and an interior;

a light source, and means for electrically operating said light source, disposed in said interior of said enclosure for attracting flying insects into said enclosure;

an adhesive surface in said enclosure for trapping insects attracted to the interior of said enclosure by said light source;

a front panel having a design therein with openings allowing access to the interior of said enclosure;

means for attaching said front panel to said front of said enclosure; and a rear panel attached to the rear of said enclosure, said enclosure, said front panel and said rear panel closing the interior of said enclosure except for said openings in said front panel, with said rear panel being visible in a direct line of sight toward said rear of said enclosure through said openings, and said adhesive surface being disposed out of said direct line of sight.

2. A flying insect trap as claimed in claim 1 further comprising a design panel carrying a non-utilitarian design disposed in said interior of said enclosure in front of said rear panel so as to be visible through said openings in said front panel in said direct line of sight.

3. A flying insect trap as claimed in claim 2 wherein said enclosure comprises a four-sided frame.

4. A flying insect trap as claimed in claim 3 wherein said frame comprises inwardly angled corners so that said front of said enclosure is smaller in area than said rear of said enclosure.

5. A flying insect trap as claimed in claim 4 wherein said frame includes a bottom side, and further comprising means for mounting said light source behind said bottom side of said frame.

6. A flying insect trap as claimed in claim 1 wherein said means for mounting said front panel to said enclosure comprises a hinge.

7. A flying insect trap as claimed in claim 1 wherein said means for mounting said front panel to said enclosure comprises means for removably mounting said front panel to said enclosure.

8. A flying insect trap as claimed in claim 1 further comprising an electronics support unit disposed in said enclosure to which said light source is mounted and on which said means for operating said light source is mounted.

9. A flying insect trap as claimed in claim 1 further comprising a cardboard strip removably disposed inside said enclosure and having a surface comprising said adhesive surface.

10. A flying insect trap as claimed in claim 1 wherein said enclosure comprises a four-sided frame having angled corners so that each side of said frame is disposed at an angle between said front panel and said rear panel, and further comprising a cardboard strip having a surface comprising said adhesive surface, said cardboard strip having a fold therein producing a vertical surface of said cardboard strip adjacent said adhesive surface, said cardboard strip being disposed in said interior of said enclosure with said adhesive surface adjacent one of said sides of said enclosure and said vertical surface parallel to said rear panel.

11. A flying insect trap comprising:

a frame enclosure having a rear adapted for mounting on a vertical surface, a front spaced from said rear and adapted to be vertically oriented, and an interior;

a front panel having a first design therein having openings therein;

a light source disposed inside said enclosure;

an adhesive surface disposed inside said enclosure;

means for attaching said front panel to said front of said enclosure for allowing light from said light source to exit said enclosure through said openings in said front panel;

a rear panel attached to the rear of said enclosure; and a design panel disposed in said enclosure so as to be visible in a direct line of sight toward said rear of said frame enclosure through said openings in said front panel, said adhesive surface being disposed out of said direct line of sight, and said design panel carrying a second design thereon.

12. A flying insect trap as claimed in claim 11 wherein said frame enclosure comprises a four-sided frame having angled corners so that said front of said enclosure has a smaller area than said rear of said enclosure.

13. A flying insect trap as claimed in claim 12 wherein said four-sided frame includes a bottom side, and further comprising means for mounting said light source in said enclosure behind said bottom side.

14. A flying insect trap comprising:

a frame enclosure having an open front, a rear adapted for mounting on a vertical surface, a front spaced from said rear and adapted to be vertically oriented, and an interior;

a light source disposed inside said enclosure;

an adhesive surface disposed inside said enclosure;

a rear panel attached to the rear of said enclosure; and a design panel carrying a non-utilitarian design disposed in said enclosure so as to be visible in a direct line of sight toward said rear of said frame enclosure through said open front, said adhesive surface being disposed out of said direct line of sight, and said design panel carrying a second design thereon.

* * * * *